(12) United States Patent
Kay et al.

(10) Patent No.: US 9,465,596 B2
(45) Date of Patent: Oct. 11, 2016

(54) CROSS SYSTEM INSTALLATION OF WEB APPLICATIONS

(71) Applicant: Google Inc., Mountain View, CA (US)

(72) Inventors: Erik Kay, Belmont, CA (US); Rahul Roy-Chowdhury, Redwood City, CA (US); Chee Heng Chew, Redmond, WA (US)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/648,473

(22) Filed: Oct. 10, 2012

(65) Prior Publication Data

US 2014/0089914 A1 Mar. 27, 2014

Related U.S. Application Data

(60) Provisional application No. 61/706,292, filed on Sep. 27, 2012.

(51) Int. Cl.
*G06F 9/445* (2006.01)
*G06F 9/455* (2006.01)

(52) U.S. Cl.
CPC ............ *G06F 8/61* (2013.01); *G06F 9/45504* (2013.01)

(58) Field of Classification Search
None
See application file for complete search history.

(56) References Cited

U.S. PATENT DOCUMENTS

| 7,870,550 | B1 * | 1/2011 | Qureshi et al. ............... 717/174 |
| 2009/0049065 | A1 * | 2/2009 | Weissman ................. G06F 8/70 |
| 2010/0306759 | A1 | 12/2010 | Kohler et al. |
| 2011/0314389 | A1 | 12/2011 | Meredith et al. |
| 2013/0159892 | A1 * | 6/2013 | Suraj et al. ................... 715/762 |
| 2014/0047413 | A1 * | 2/2014 | Sheive ................. H04L 65/403 717/110 |

FOREIGN PATENT DOCUMENTS

WO 2014/052380 A1 4/2014

OTHER PUBLICATIONS

"Getting Started with Adobe AIR for HTML/JavaScript Developers", Adobe Developer Connection, Aug. 1, 2011, 2 pages.
"Create your first HTML-based AIR application with Dreamweaver", Adobe AIR, May 31, 2012, 2 pages.
"Distributing AIR packages for desktop computers", Adobe AIR, May 10, 2012, 2 pages.
"Google Chrome Frame", Google Developers, May 31, 2012, 2 pages.
"Learn AIR", Adobe AIR Developer Center, May 31, 2012, 2 pages.
"Prism", Mozilla Labs, May 31, 2012, 2 pages.
International Preliminary Report on Patentability for International Application No. PCT/US2013/061568, mailed on Apr. 9, 2015, 6 pages.
Search Report and Written Opinion for International Application No. PCT/US2013/061568, mailed Dec. 10, 2013, 8 pages.

\* cited by examiner

*Primary Examiner* — Chuck Kendall
(74) *Attorney, Agent, or Firm* — Brake Hughes Bellermann LLP

(57) ABSTRACT

A method and system for providing cross system installation of applications, include providing for installation, via a server, a natively operating application coded only with web technologies, and providing for installation a single runtime environment that provides the natively operating application access to computer system-level services that are not available to web applications. The single runtime environment controls the installation and uninstallation of the natively operating application, and the natively operating application is configured to execute independent of a web browser.

19 Claims, 6 Drawing Sheets

CROSS SYSTEM INSTALLATION OF WEB APPLICATIONS

RELATED APPLICATIONS

This application is a nonprovisional of, and claims priority to, U.S. Provisional Patent Application No. 61/706,292, filed on Sep. 27, 2012, entitled "CROSS SYSTEM INSTALLATION OF WEB APPLICATIONS," which is hereby incorporated by reference in its entirety.

TECHNICAL FIELD

This disclosure generally relates to cross system installation of applications that operate as native applications, yet are programmed using web technologies.

BACKGROUND

Typically, a person must access a web store or digital marketplace using a specific kind of operating system or web browser. Yet, a person may want to access a web store or digital marketplace using any kind of operating system or web browser, and people want the ability to download applications from a digital marketplace regardless of the type of operating system or browser. People also appreciate the ability to run applications "natively" on a client computer. Yet, typical web applications do not provide access to local system resources, such as file systems, native windows, graphics processors, microphones, cameras, and therefore have may have limitations. In general, web applications have a more restrictive security model, which limits how much of a local system's resources the web application is able to access.

It may also prove advantageous for developers if they are not required to use separate programming techniques, or to develop many different versions of applications, to have the application run on different operating system platforms (e.g., WINDOWS, MAC, or LINUX). Typically, developers need to build an application for each platform. It is also advantageous for developers if those same applications can also run on the web and be downloaded via any kind of web browser. Further, developers may want to use JAVASCRIPT, HTML, CSS, or other web technology to develop applications that can operate natively on computers and mobile devices. Developers may also want to have those same applications be capable of operating as web applications via a web browser as well as operating natively and thus having access to at least some native resources. Therefore, a need exists for systems and methods to address the shortfalls of present technology and to provide other new and innovative features.

SUMMARY

A method and system for providing cross system installation of applications, include providing for installation, via a server, a natively operating application coded only with web technologies, and providing for installation a single runtime environment that provides the natively operating application access to computer system-level services that are not available to web applications. The single runtime environment may control the installation and uninstallation of the natively operating application, and the natively operating application is configured to execute independent of a web browser.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Systems and methods described here allow for cross-system installation of natively operating applications that are coded with web technologies (such as HTML, JavaScript, CSS, etc.). The natively operating applications may operate via a single runtime environment that is locally installed on a client computer. The natively operating applications may provide access to local machine resources, and may also provide access to other web services, such as cloud storage, web document editing, or photo editing. The natively operating applications, because they are coded with web technologies, may also be configured (e.g., packaged) to run in a web browser without requiring further coding from a developer. A natively operating application may be downloaded and installed on any operating system, from any browser, whenever the single runtime is installed. The browser may automatically determine if the single runtime is already installed on a computer, prior to installing a natively operating application. If the single runtime is not already installed, the browser may automatically install the single runtime, for example by a single download including the application and runtime. The runtime operates using a multi-process architecture, and installs the natively operating applications in a sandbox, such that when the natively operating applications are uninstalled, they are completely removed from a client computer.

Figure 1:
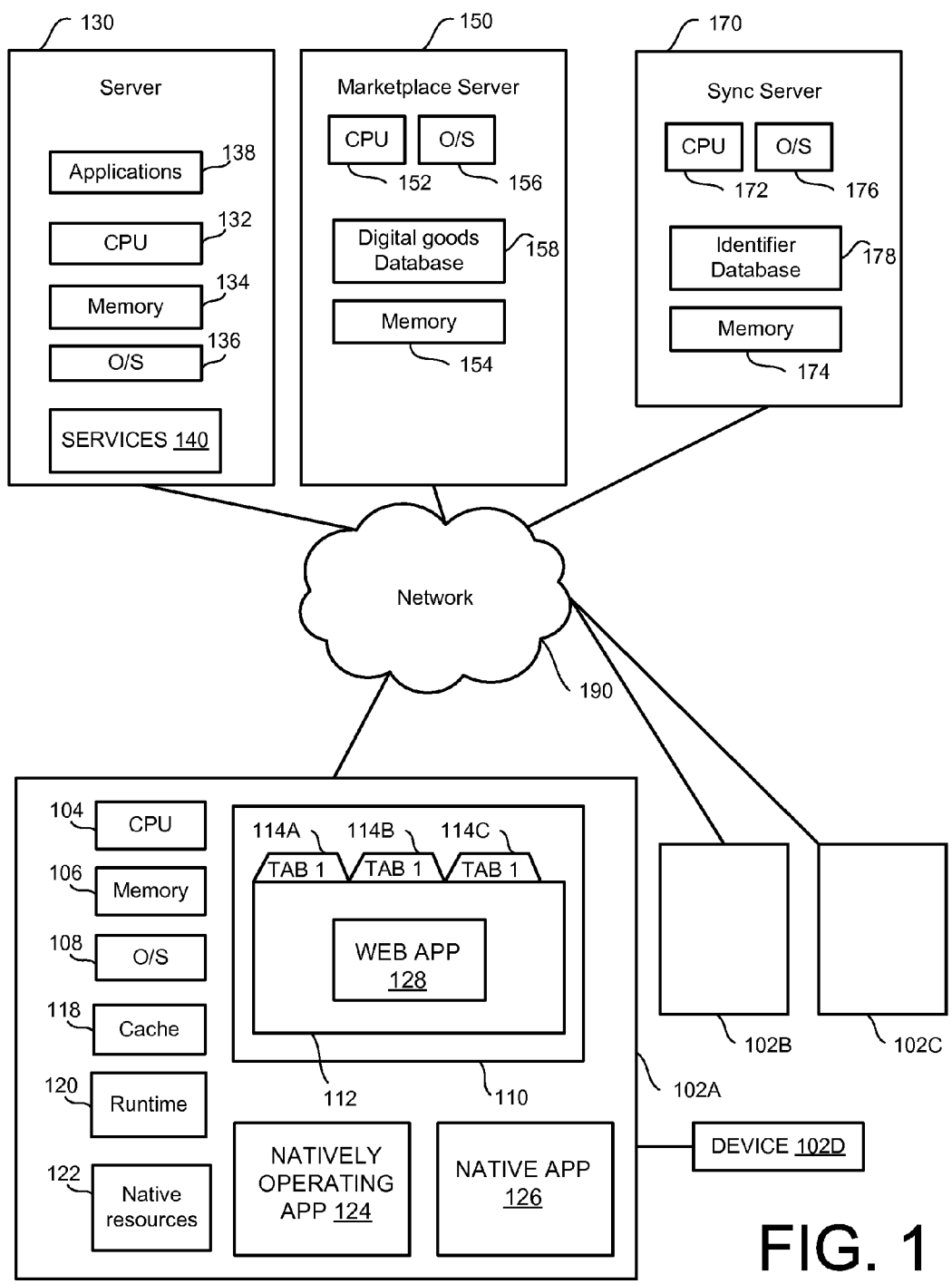
FIG. 1 is a schematic diagram of a system for cross system installation of web applications.

FIG. 1 is a schematic block diagram of an example embodiment of a system 100 that may provide cross system installation of web applications. In various implementations, the system 100 may include client computing devices 102A, 102B, 102C (such as desktop computers, notebook computers, netbook computers, tablet computers, smart-phones, etc.). A client computing device 102A can include one or more processors (CPU) 104 and one or more memories 106. The client computing device 102A can execute an operating system (O/S) 108, a runtime 120, and various applications (110, 124, and 126) which may display a user interface window (e.g., web browser 112). The client computing device 102A can include a cache 118. The client computing device 102A can include a natively operating application 124 as well as one or more native applications 126. Application 110 is another example of a native application, and the user interface window 112 of application 110 is a web browser. Other examples of native applications 126 include word processing applications, image editing applications, email applications, media players, calculators, etc.

A "natively operating application" 124 is an application that is coded using only web technology (defined here as code that can be implemented directly by a web browser), such as HTML, JAVASCRIPT, or CSS, but is an application that looks and behaves like native applications (and are not tied to a web browser), and has native-like capabilities that are not available to web applications. Natively operating application 124 may also be run in a web browser, such as web browser 112.

Natively operating application 124 may be downloaded from a marketplace server 150 via a web browser, such as web browser 112, and may be installed on client computing device 102A. The natively operating application 124 may operate using runtime 120, which is described in more detail below. The natively operating application 124 may be configured to be executed directly by a processor 104 of the client device, using runtime 120, for example. Because natively operating application 124 is coded with web technologies, no compilation step is required. Instead, natively operating application 124 may simply be packaged (e.g., in a .CRX format, or zipped, for example with some signature or verification) and provided to client computing device 102A, for example via web browser 112 from a digital marketplace such as marketplace server 150, as described in more detail below. The runtime 120 may accept the natively operating application 124 as a packaged file (e.g., .CRX files) and then execute the natively operating application 124. Natively operating application 124 may load locally, so that it is less dependent on a network than a web application, for example.

Runtime 120 may be an environment that operates above the native O/S 108 and that uses a multi-process architecture. Thus, if one natively operating application 124 crashes, a user will not lose other natively operating applications that are simultaneously also running via runtime 120. Each application operates as a new process on the single runtime, as described in more detail below with respect to FIG. 2.

Runtime 120 may act as an intermediary environment that allows a natively operating application 124 to run on any computing device using any operating system, as long as the runtime 120 is installed on the computing device, such as computing device 102A. Runtime 120 may allow the natively operating application 124 to appear as if it is a native application, while the natively operating application 124 is not actually being executed through the O/S 108 (but still may be able to access portions of the O/S 108). Runtime 120 may also, in some implementations, be utilized to execute application 110 (including web browser 112).

Runtime 120 itself may also be downloaded from a marketplace server 150 (or another server) via a web browser, such as web browser 112, and may be installed on client computing device 102A. In some implementations, runtime 120 may already be installed on client computing device 102A when natively operating application 124 is installed. In other implementations, runtime 120 may be bundled with a single download with natively operating application 124, and/or downloaded or installed prior to installation of natively operating application 124.

Natively operating application 124 may, via runtime 120, access a network 190, and may also access one or more native resources 122 of a client computer. Native resources 122 may include any kind of resource included in or locally connected to computing device 102A. For example, native resources 122 may include native windows (e.g., any windows outside a web browser tab), a graphics processing unit (GPU), a web camera, a graphics card, a microphone, a printer, a file system including documents, images, other media, or other resources, such as device 102D connected to computing device 102A. Natively operating application 124 may be coded with web technologies, similar to web applications (which are described in more detail below), but in contrast to web applications, natively operating application 124 may access native resources 122 of client computing device 122.

Natively operating application 124 may operate offline by default. Natively operating application 124 may also load locally. In some implementations, once a user installs natively operating application 124, the user has full control over the natively operating application 124's lifecycle. The lifecycle of the natively operating application 124 is independent of a web browser window or a network connection. The lifecycle of a natively operating application is described in more detail below with respect to FIG. 4B. Natively operating application 124 may open and close quickly, and the system 100 can shut natively operating application 124 down at any time to improve performance (for example, using runtime 120). Users can fully uninstall natively operating application 124. In some implementations, user data related to natively operating application 124 may be stored locally while the natively operating application 124 is offline, for example in memory 106, and then synced (with user permission) up to a data server (e.g., server 130 or sync server 170) once a user of client computing device 102A is online.

Additionally, natively operating application 124 may access various remote services 140 that may be accessible via remote servers. Access to such services 140 may be available via various JavaScript APIs that are hosted by runtime 120.

APIs may also be available for other capabilities. Such APIs are not available for web applications, web sites, or native applications. For example, shared data APIs may provide natively operating application 124 with access to data on computing device 102A, where such access is provided in a mediated fashion, so that natively operating application 124 can access contacts, images, photos, media, video, music, or movies, as examples. Such access is provided via shared data APIs. Additionally, device capability APIs may provide natively operating application 124 with access to hardware devices such as a USB device port, or a BLUETOOTH device connected to computing device 102A. The natively operating application 124 may connect to USB devices, and read from and write to a user's serial ports, for example to send messages to any device connected to local computing device 102A, such as device 102D. Still further, services APIs may provide payments, identity, or other services to natively operating application 124.

As shown in FIG. 1, the system 100 can include a server 130 that includes one or more processors 132, one or more memories 134, an operating system 136, and services 140. Services 140 may be available via server 130, and accessed via an API hosted by runtime 120, for example. As discussed above, services may include, as examples, payments or identity services. For example, a user may utilize identity services to give permission to a natively operating application 124 to access a user's identity without requiring the user to re-enter identity information each time the user runs the natively operating application 124. Similarly, a user may utilize payment services to give permission to a natively operating application 124 to access a user's payment information without requiring the user to re-enter such payment information each time the user runs the natively operating application 124.

APIs exposed to a natively operating application 124 by runtime 120 may also include shared data capabilities, which may allow for users to utilize natively operating application 124 to upload data to (or download data from) a server such as server 130. An example of a shared data capability may include a data uploading or storage service, such as allowing a user to upload photos from client computing device 102A, via a natively operating application 124. The photos may be uploaded to provide backup storage on a remote server, such as server 130. For example, in one implementation, natively operating application 124 may automatically access photos stored in a portion of memory 106, using capabilities exposed through a JavaScript API, and without requiring additional input from a user (yet, with a user's prior permission). Natively operating application 124, using the API may automatically access only the photos and not other types of files (e.g., based on a file type, file name, file size, or other criteria), and may also automatically upload the photos (with a user's permission) to an account associated with the user. The photos may be uploaded, for example, to server 130, using network 190.

Other capabilities may also be exposed through shared data APIs, for example to provide access to a media gallery, music, movies, or documents. A music related natively operating application, for example, may access only a portion of a file system containing music, so that the application can do something with the music such as sync the music with a user account. Using a shared data API, a natively operating application 124 can request access to all music on device 102A. The API may determine what music is stored on device 102A, and the application may get the music and sync it to a remote server (e.g., server 130). Natively operating application 124 does not require a separate plug-in to get and sync the music, yet natively operating application 124 may read or write files to a local system in a safe manner due to process isolation controlled by runtime 120, as discussed in more detail below with respect to FIG. 2.

Still further APIs may include device capability APIs, which may allow natively operating application 124 to have access to devices which web applications may not generally access. For example, natively operating application 124 may have USB access, raw network access, or BLUETOOTH device access, as examples.

In various implementations, the web browser 112 may include or be associated with one or more web applications 128. In this context, a "web application" may be configured to perform a single task or multiple tasks for a user. In such an implementation, the web application may be configured to be executed or interpreted by the web browser. This is compared with the native applications (e.g., native application 126) that include machine executable code and are configured to be executed directly by a processor or via the operating system of the client device, whereas, a web application may be incapable of execution or display without the aid of the web browser. This is also compared with natively operating application 124, which does not require a web browser. Thus, web applications are run inside a browser with a dedicated user interface, and typically provide functionality and an experience that is more rich and interactive than a standalone website but are less cumbersome and monolithic than a native application 126. Examples of web applications include games, photo editors, and video players that are run inside the web browser 112.

Web applications can include at least a portion of a web site that itself includes web pages, plus some metadata that may be especially pertinent to the web application or to the user of the web application to allow the web application to perform some particular functionality for the user.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run stand-alone, like any regular website. Web browser extensions and applications can be downloaded for installation in and execution by a browser running on a client computing device.

In one implementation, the client computing device 102A may be running or causing the operating system 108 to execute application 110 or web browser 112. In various implementations, this web browser 112 may include a plurality of panes or tabs 114A, 114B, 114C. The web browser 112 can be a visual area, usually rectangular, containing some kind of user interface. In a graphical user interface (GUI) used in the client device 102A, the web browser 112 can be a two-dimensional object arranged on a plane of the GUI known as the desktop. The web browser 112 can include other graphical objects that may be called the "chrome" of the web browser, e.g., a menu-bar, toolbars, controls, icons. The web browser may also include a working area in which a document, image, folder contents, or other main object (e.g., web application 128) can be displayed. The working area may be capable of holding only one main object (i.e., in a single document interface) or more than one main object in a multiple document interface. In some applications, specifically web browsers, multiple documents can be displayed in individual tabs 114A, 114B, 114C. These tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." The tabs 114A, 114B, and 114C may execute in separate processes, each with its own individual memory.

The client computing devices 102A, 102B, 102C may receive online content from one or more server computing devices 130, 150, 170, that may be connected to the client device 102 through a network 190. In some implementations, the received online content can be processed and displayed in the web browser 112 (e.g., in a on a tab 114 of the web browser 112). For example, the web browser 112 can display a user interface of a marketplace for digital goods, similar to the user interface of the marketplace described herein, to a user.

The client computing device 102A can communicate with a digital goods marketplace server 150 that provides a marketplace for digital goods to client computing devices 102A, 102B, 102C. The marketplace server 150 can include one or more processors 152 and one or more memories 154. The marketplace server 150 can execute an operating system and various applications and services to provide functionality to the client computing devices. For example, in one implementation, the marketplace server 150 can include a repository for database of digital goods 158, and the digital goods can be served from, or downloaded from, the repository to the client computing devices. In another implementation, the digital goods can be stored in, and serve to client computing devices from, a repository that is remotely located from the marketplace server. For example, digital goods could be stored and served to client computing devices from individual repositories that are operated and controlled by developers of the digital goods, and digital goods repository 158 of the marketplace server 150 can provide just a reference to the individual repositories that are operated by the developers.

Information that is provided by an application 110 running on a client device to the marketplace server 150 (e.g., regarding the type or capabilities of computing device 102A, etc.) can be provided on an opt-in basis. In other words, such information may be provided from the client computing device 102A to the server 150 only if the user of the client device specifically authorizes the transmission of such information from the client to the server. In addition, information may be anonymized before it is sent to marketplace server 150.

As shown in FIG. 1, the system 100 can also include a sync server 170 that includes one or more processors to 172, one or more memories 174, an operating system 176, and an identifier database 178. The identifier database 178 can store unique identifiers to enable syncing between various user sessions on different client computing devices (e.g, devices 102A, 102B, 102C).

For example, in some implementations, a user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system (e.g., server 170) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, for example, when a user signs into a web browser 112 or a certain device 102A, all of the user's bookmarks, extensions, web applications, natively operating applications, theme, and other browser preferences may be saved (e.g., in memory 174) and synced to a user's account (e.g., using identifier database 178). The user can then load these settings anytime the user signs into the web browser 112 on other computers and devices (e.g., devices 102B or 102C). Changes to browser settings, for example, may be synced instantaneously to the account, and may be automatically reflected on other computers where the user has signed in (and enabled syncing).

When a web application or natively operating application 124 has been installed, computing device 102A may locally store some data related to the application. A server (e.g., sync server 170) may ensure that local data from computing device 102A is synced across all of a user's devices or all devices that are used to log the user into a user account. Additionally, passwords traditionally are stored locally, but can be synced across devices using the server. Further, the server may sync across different devices all installed natively operating applications, web applications, browser extensions, browser bookmarks, settings, profiles, browser history, themes, plugins, local permissions, mode indicators, and data associated with the web applications and browser extensions for a user. For example, if a user of computing device 102A accesses a user account (for example, via a web browser) from computing device 102C, server 150 may copy settings and data associated with web applications and browser extensions (for example, that the user has selected to sync) from the user account to computing device 102C. Further, the server may be capable of device-sensitive sync. For example, certain versions of web applications with powerful graphics may be suitable for a desktop computer with a hardware accelerator and large display monitor, but not as suitable for a web-enabled phone, tablet, or laptop. The server may determine that a version of the web application is not as suitable for a user's web-enabled phone, tablet, or laptop, and may notify the user (e.g., during a sync or login process), or exclude a version or a web application from syncing on the user's web-enabled phone, tablet, or laptop.

Changes to settings on one computing device may be automatically copied (e.g., via server 170) from other computers (for example, if the user has enabled that sync feature). Synced data may be encrypted when it travels between computing devices 102A, 102B, 102C, and server 150 to keep information secure. Further, passwords may be encrypted on computing devices 102A, 102B, 102C, and server 150 using a cryptographic key.

In some implementations, natively operating applications, such as natively operating application 124 shown in FIG. 1, may have raw network access (e.g., via an API) to push data back and forth to a server, such as server 130. Additionally, natively operating application 124 may, in some implementations, be synced across all of a user's sessions, for example using sync server 170. For example, as mentioned above, a natively operating application 124 may access an identity service using the runtime 120 (e.g., using an API), so that if a user is signed into a system, the natively operating application 124 may access an identity of a logged-in user, for example via a unique identifier (if the application has the user's permission).

Figure 2:
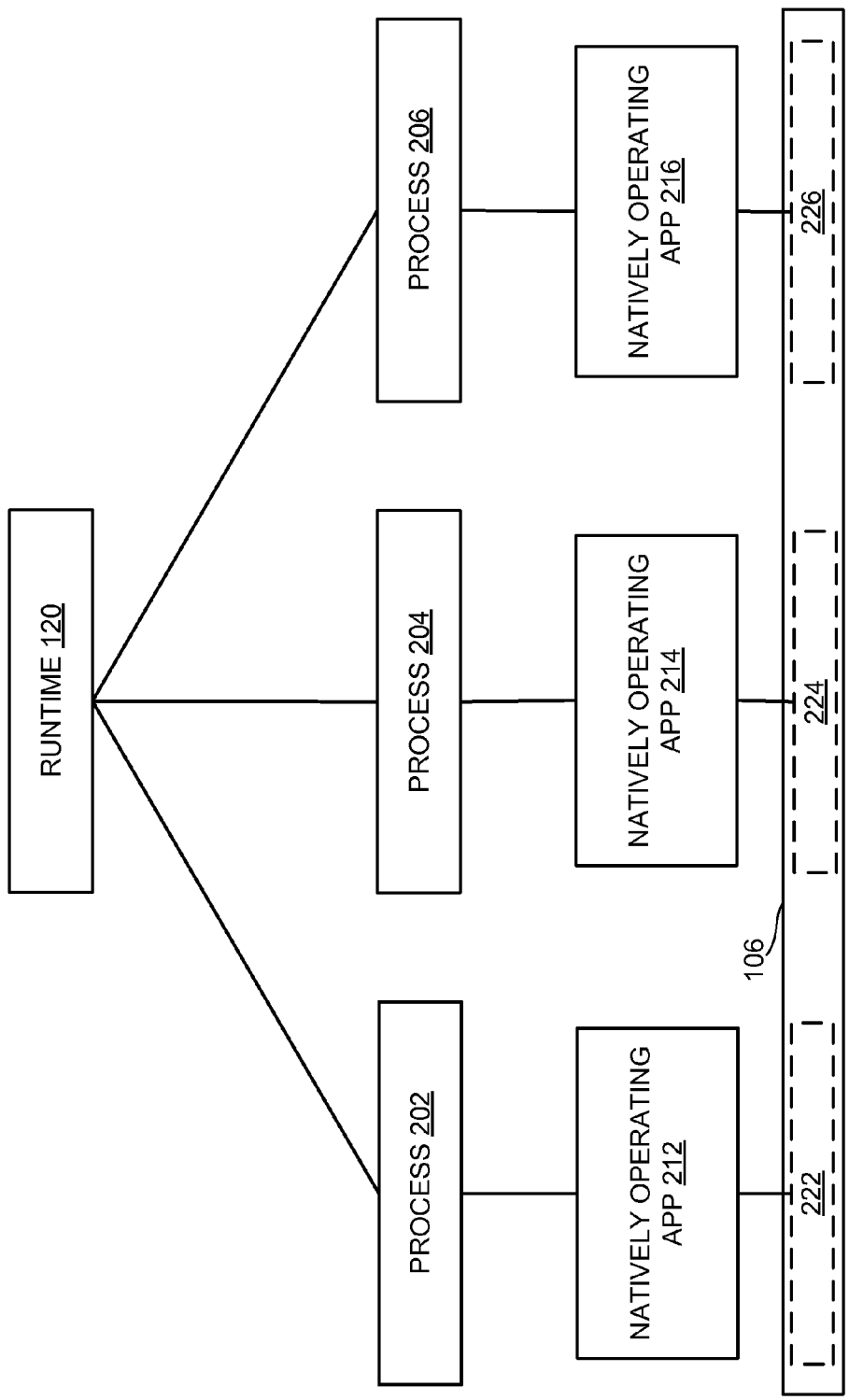
FIG. 2. is an example block diagram of a runtime using a multi-process configuration.

FIG. 2. is an example block diagram of a runtime multi-process configuration. As discussed above, each natively operating application using runtime 120 may use a separate process to protect the overall system from bugs glitches in any of the natively operating applications. Access may be restricted from natively operating application process to other natively operating application processes and to the rest of the system. In this manner, one process running for one application is isolated and separate from other processes running for other applications. A web browser (such as web browser 112) may be executed using runtime 120, and may be executed it its own process.

As shown in FIG. 2, runtime 120 may execute separate processes 202, 204, and 206, which each display user interfaces for separate natively operating applications 212, 214, and 216, respectively. As discussed above, natively operating applications 212, 214, and 216 are coded with web technologies (e.g., HTML, JAVASCRIPT, etc.) but do not require a web browser to operate. Natively operating applications 212, 214, and 216 may execute separate processes that each may have separate read/write access to at least a portion of memory 106, such as portions of memory 222, 224, or 226, respectively, as examples. In some implementations, natively operating applications 212, 214, and 216 may execute separate processes, each having its own memory (e.g., memory 222, 224, 226) and its own copy of global data structures. One natively operating application (e.g., 212) may be busy while all the other natively operating applications are in use. If there is an error (e.g., in a renderer process) of one of natively operating applications 212, 214, and 216, it may not affect the other applications or crash the entire runtime 120. Further, each of natively operating applications 212, 214, and 216 may be sandboxed using runtime 120, so that when uninstalled, no remnants of the applications remain on the computing device. For example, no executing code or private data is left on the computing device. This may be done because runtime 120 may control any uninstallation of natively operating applications 212, 214, and 216, and because runtime 120 isolates natively operating applications 212, 214, and 216 so that each natively operating application 212, 214, 216 has its own isolated data storage (e.g., 222, 224, 226) so that each natively operating application cannot affect other data storage. Further, each natively operating application 212, 214, 216 cannot access personal data (such as cookies) for websites that a user accesses in a web browser. This type of isolation, which may also be known as sandboxing, leverages security provided by an operating system to allow code execution that cannot make persistent changes to the computer or access information that is confidential. Such isolation and controlled uninstallation is different from native applications, which merely uninstall themselves (and in some cases, may not do so thoroughly) and which may generally also access any portion of memory, or private data. In contrast, runtime 120 may control the uninstallation of natively operating application 124.

As one illustrative example, natively operating application 212 may be a photo editor that saves the edited photos to an isolated portion of memory, i.e., memory portion 222. To access the photos to edit, however, natively operating application 212 may need to access previously stored photos that are in another portion of memory 106. In such a case, an API may provide natively operating application 212 access to all local photographs on memory 106 (e.g., only JPEG or BITMAP files). The API may control how such access is managed because the API is operating through runtime 120. In such an example, natively operating application 212 could not utilize the API to access other types of files or have unauthorized access to other portions of memory 106.

Figure 3:
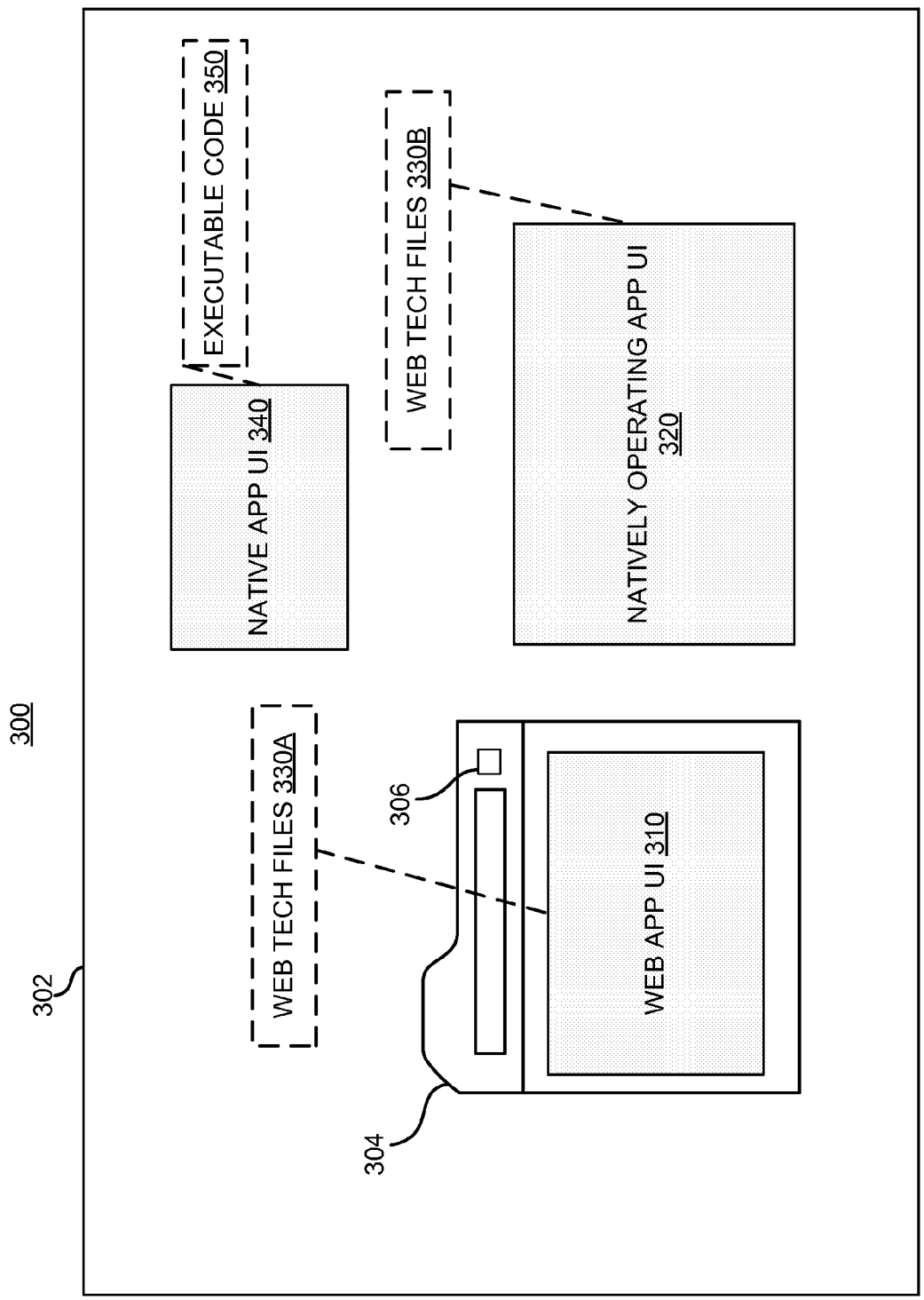
FIG. 3 is a diagram of an example of a user interface for native applications, natively operating applications, and web applications.

FIG. 3 is a diagram of an example of a user interface that may be used for native applications, natively operating applications, and web applications. User interface 302 may be a display of a computing device (e.g., desktop, smartphone, etc.), such as device 102A from FIG. 1. User interface 302 may include various graphical user interface elements. Some optional graphical user interface elements are not depicted in FIG. 3, such as a desktop toolbar, desktop icons, theme, smartphone application icons, etc.

User interface 302 may include a browser user interface 304, a natively operating app user interface 320, and a native app user interface 340. Browser user interface 304 may include various browser "chrome" 306 elements, including the borders of browser web browser 112, window frames, menus, toolbars, and scroll bars, for example. Browser user interface 304 may be displayed by a web browser that executes a web application, which displays web application user interface 310. The web application may not have automatic access to any local resources of computing device 102A, such as a printer, camera, file system, USB drive, etc., because of the security model of the web. This lack of automatic access may make a web application more secure from a user's perspective. In contrast, a native application may have read/write access to a memory of computing device 102A, may access local resources, or may even run malware. Natively operating applications, in contrast, may have the security of web applications but may also some additional automatic access to local resources, for example via APIs, which give additional power to the application (such as access to local devices, GPUs) while maintaining security features (such as sandboxing and process isolation).

Natively operating application user interface 320, in contrast to web application user interface 310, does not include any browser chrome. Both web application user interface 310 and natively operating application user interface 320 may be implemented by a packaged group (i.e., one or more) of web technology files 330A and 330B, respectively. The web technology files 330A and 330B may contain all the logic that runtime 120 needs to execute the applications. The web technology files 330A and 330B may include, as examples, JAVASCRIPT, HTML, CSS, or other web technology files. The web technology files 330A and 330B do not require separate compilation to execute the web application or natively operating application. Further, a developer may use the same basic web technology files 330A and 330B, for example with different packaged formats, to implement both a web application and a natively operating application. As an example, a developer may provide a link or pointer to the files on a developer server for a web application, and may provide a packaged file (e.g., in a CRX format) available for download for the same application to operate as a natively operating application. In contrast, a native application user interface 340 is implemented by executable code 350, and not by web technology files. Further, native applications cannot be run as web applications in a web browser.

Figure 4A:
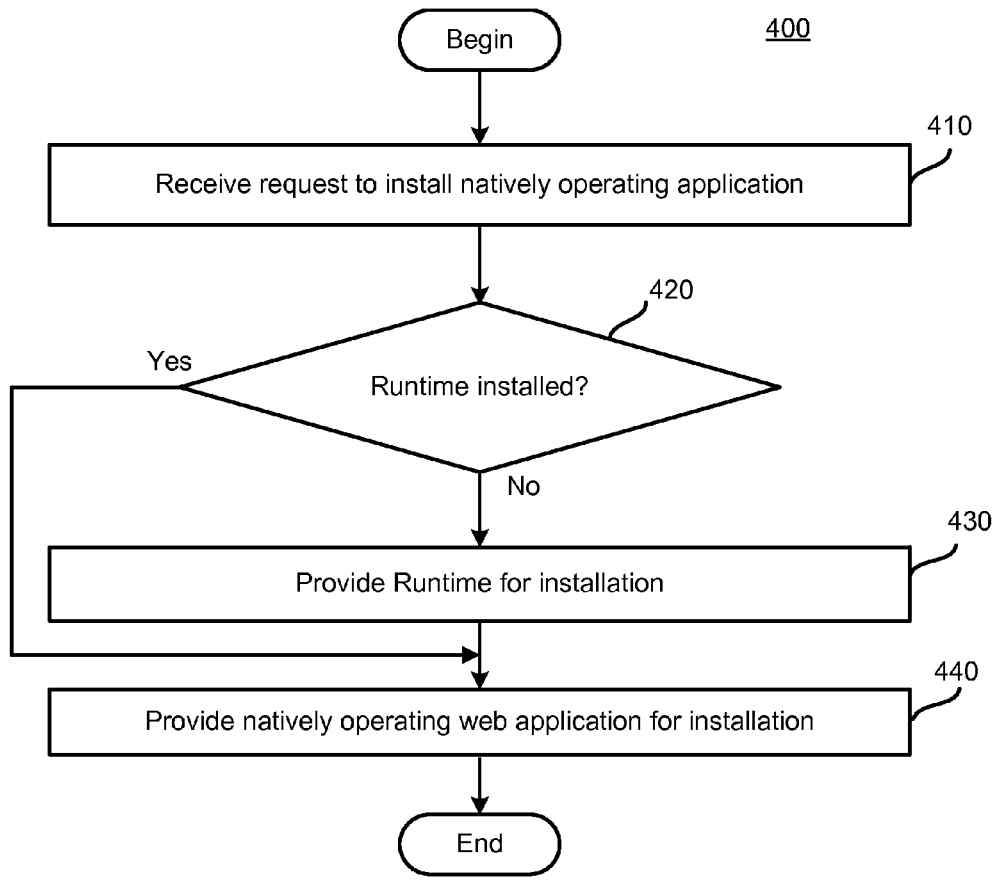
FIG. 4A is a flowchart of a process for cross system installation of web applications.

FIG. 4A is a flowchart of a process for cross system installation of web applications. The flowchart shown in FIG. 4A may be performed at least in part by a server (e.g., marketplace server 150 shown in FIG. 1). The server may receive a request to install a natively operating application (410). The server may test for the presence of a runtime (420) before an installation of a particular natively operating application, for example by an API call to determine if the device has the runtime installed, or by detecting a type of web browser accessing the digital marketplace server 150. If the runtime is already installed (420, yes), it does not need to be downloaded again onto the machine, and in some implementations, a server may send an instruction to a browser to simply launch the runtime 120 (not shown). If the runtime is not already installed (420, no), the server may provide the runtime for installation (430), for example, with permission from a user who has made the request to install the natively operating application. In one implementation, the installation may be performed by providing a user with a meta-installer that includes the runtime 120 and knows how to install itself once the user opens the meta-installer. The server may also provide the user with one or more references (such as a unique ID, name, language, brand, or other data) to the desired natively operating application, which the runtime 120 can then download and install. In some implementations, the meta-installer may also periodically update the runtime 120 once it is installed on the device, or upgrade the device's runtime if there is a more recent version. The server may also provide the natively operating web application for installation on the client computing device (440).

The process shown in FIG. 4A is an example of one implementation, and may have steps deleted, reordered, or modified. For example, 430 and 440 may be combined, and the entire process may be a one-click download from a user's perspective, requiring no further input from the user. As another example, the process 400 may also include determining that a computing device includes a specified feature (e.g., a GPU or a web camera), and filtering natively operating applications based on the specified feature. In another example, the server may determine a type of browser accessing the digital marketplace, and may determine that if the web browser is of a particular type, the runtime is already installed for that computing device.

Figure 4B:
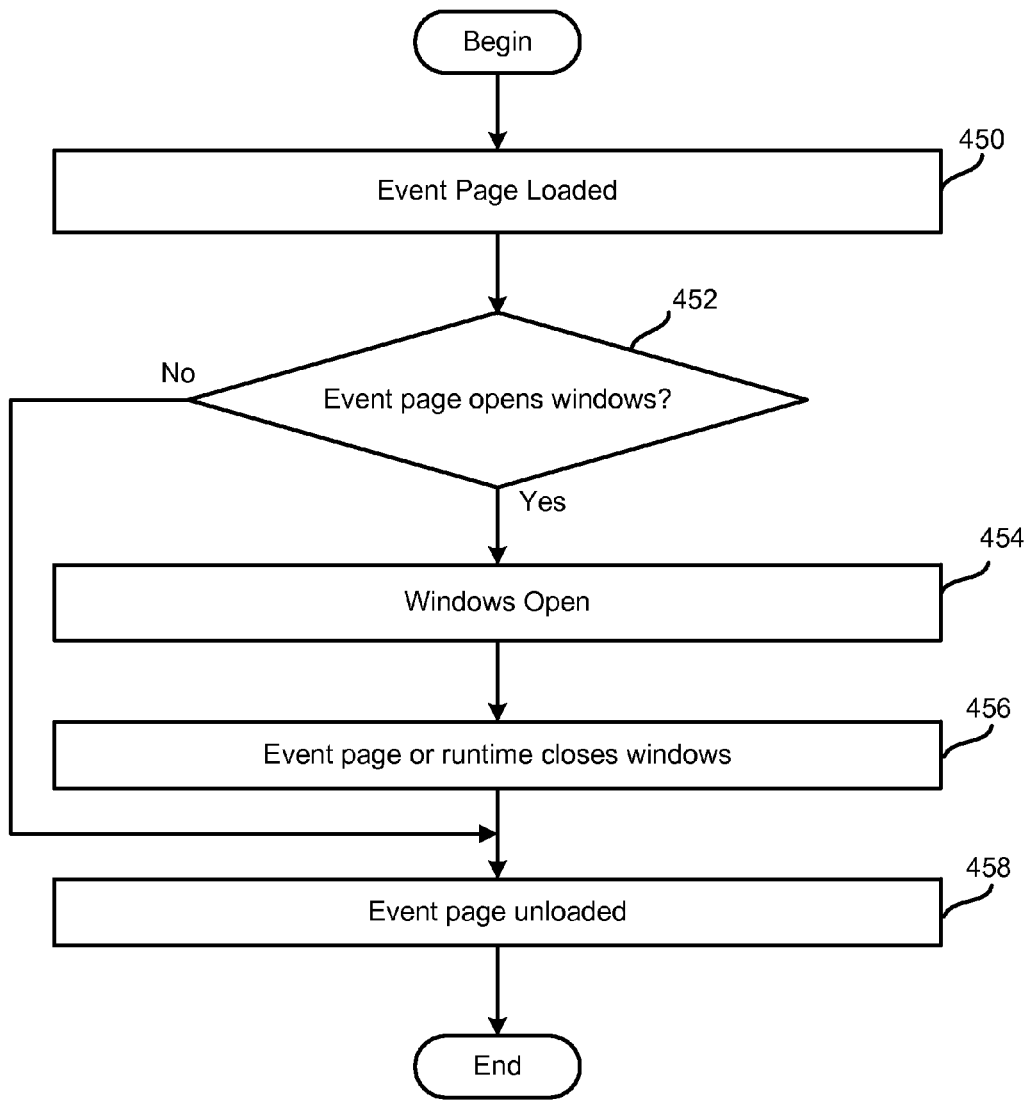
FIG. 4B is a flowchart of a lifecycle of a natively operating application.

FIG. 4B is a flowchart of a lifecycle of a natively operating application. When the natively operating application is opened (e.g., by a user clicking on a desktop icon associated with the application), the natively operating application runtime loads an event page (450) from a user's desktop. An event page may be a web page that contains all top-level logic of the application with none of its own user interface. The event page may be responsible for creating the user interface windows for all the other application pages.

When the event page is loaded, an onLaunch( ) event is fired. This event may tell the event page what windows to launch and their dimensions.

If the event page opens windows (452, yes), then one or more windows are open for a user to view and access (454). For example, a main user interface of a photo editing application may be displayed. The event page, or the runtime, may close the windows (456), for example when the user clicks on an icon to exit the application. The runtime unloads the event page (458) and closes the application.

When the event page has no executing JavaScript, no pending callbacks, and no open windows (452, no), the runtime unloads the event page (458) and closes the application. In some implementations, before unloading the event page, an onSuspend( ) event is fired. This gives the event page opportunity to do simple clean-up tasks before the application is closed. Once this event is fired, the runtime starts the process of closing the application. All events stop firing and JavaScript execution is halted. Any asynchronous operations started while handling this event are not guaranteed to complete.

Figure 5:
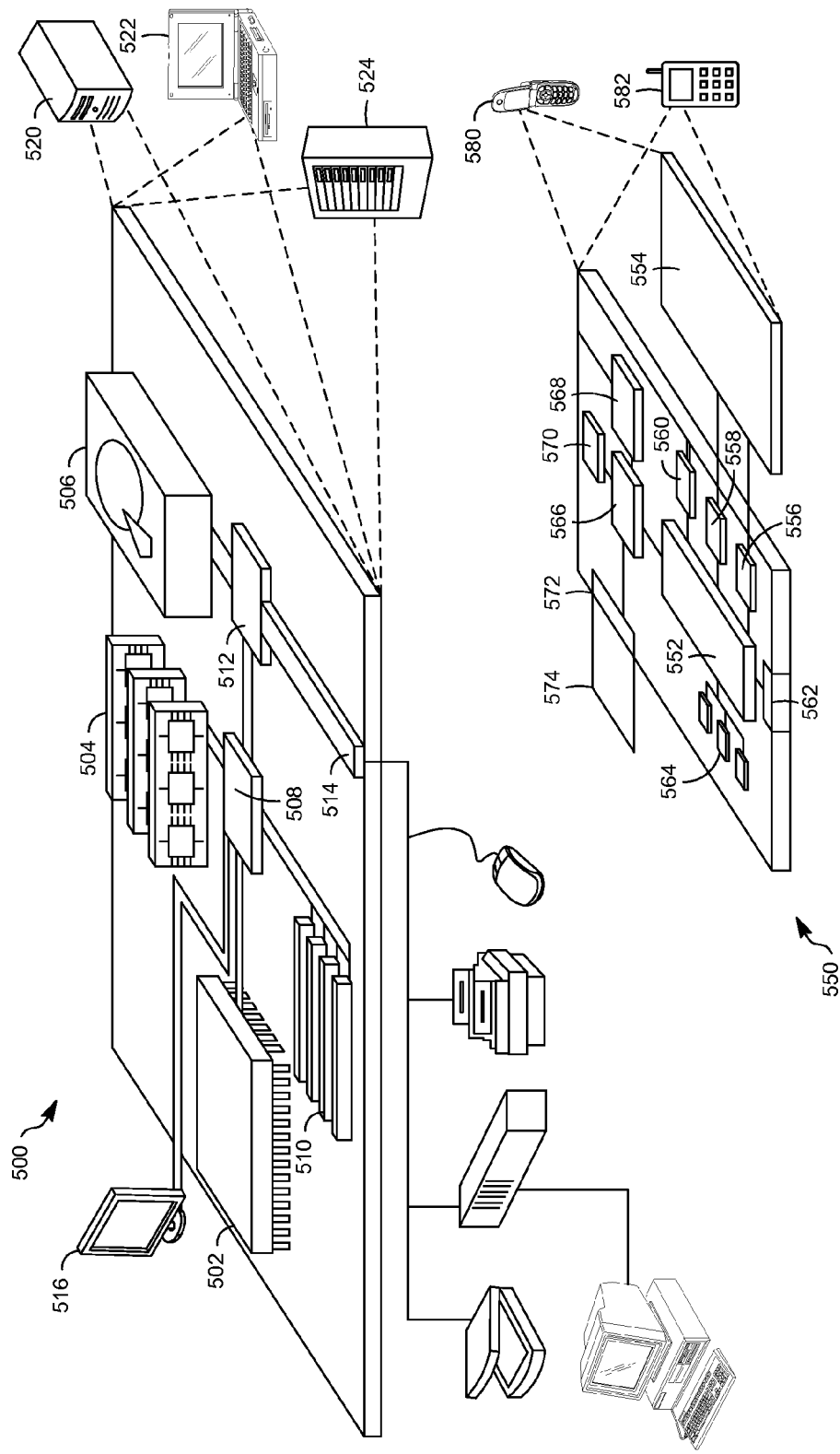
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 550. It may also be implemented as part of a smart phone 552, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for providing cross system installation of applications, comprising:
   providing, via a server, an application for installation on a client computing device, wherein the application is coded only with web-technology programming languages, the application being executable on the client computing device without compilation;
   automatically determining, based on a type of web browser accessing the server, whether the client computing device has already installed a single runtime environment; and
   providing, via the server after the automatically determining, the single runtime environment for installation on the client computing device, wherein the single runtime environment provides the application access to computer system-level services that are not available to web applications running within a browser window,
   wherein the single runtime environment controls the installation and uninstallation of the application on the client computing device, and
   wherein the application, in conjunction with the single runtime environment, executes independently from a web browser and executes as a separate process from a process of the runtime environment.

2. The method of claim 1, further comprising simultaneously installing the single runtime environment and the application.

3. The method of claim 1, further comprising:
   providing access to web services for the application.

4. The method of claim 2, wherein the simultaneously installing is performed using a meta-installer downloaded by the client computing device.

5. The method of claim 1, further comprising implementing respective separate processes for each of a plurality of applications that are coded with only web-technology programming languages, such that each application of the plurality of applications has its own access to a separate portion of a memory of a client computing device.

6. The method of claim 1, wherein executing the application includes starting, by the single runtime environment, a new process for the application, the new process being separate from a previously created process corresponding with execution of a second application that is coded with only web-technology programming languages.

7. The method of claim 1, wherein the web-technology programming languages include HTML, CSS, and JavaScript.

8. The method of claim 1, wherein the computer system-level services include: a graphics card, a web camera, a speaker, a USB drive, or a file system of a client computing device.

9. The method of claim 1, further comprising:
   uninstalling the application from the client computing device by completely removing the application from a sandboxed area of a memory of the client computing device.

10. The method of claim 1, wherein the application displays a standalone user interface on the client computing device.

11. The method of claim 1, wherein the application is synced, using a user account, across sessions associated with the user account.

12. The method of claim 1, wherein the application requests a permission from a user for access to local data or for access to a network.

13. The method of claim 12, wherein the access to a network includes access to shared data services or identity services.

14. The method of claim 13, wherein the access to local data includes access to a portion of a file system on the client computing device.

15. The method of claim 14, wherein the portion of the file system includes: image files, music files, or document files.

16. The method of claim 15, further comprising using the application to sync the portion of the file system to a portion of a network storage associated with a user account.

17. A method for providing cross system installation of applications, comprising:
   providing, via a server, an application for installation on a client computing device, wherein the application is coded only with web-technology programming languages, the application being executable on the client computing device without compilation;
   providing, via the server, a single runtime environment for installation on the client computing device, wherein the single runtime environment provides the application access to computer system-level services that are not available to web applications running within a browser window; and implementing respective separate processes for each of a plurality of applications that are coded with only web-technology programming languages, such that each application of the plurality of applications has its own access to a separate portion of a memory of a client computing device;

wherein the single runtime environment controls the installation and uninstallation of the application on the client computing device, and wherein the application, in conjunction with the single runtime environment, executes independently from a web browser and executes as a separate process from a process of the runtime environment.

18. A method for providing cross system installation of applications, comprising:

providing, via a server, an application for installation on a client computing device, wherein the application is coded only with web-technology programming languages, the application being executable on the client computing device without compilation; and providing, via the server, a single runtime environment for installation on the client computing device, wherein the single runtime environment provides the application access to computer system-level services that are not available to web applications running within a browser window;

wherein the single runtime environment controls the installation and uninstallation of the application on the client computing device, wherein the application, in conjunction with the single runtime environment, executes independently from a web browser and executes as a separate process from a process of the runtime environment, and wherein executing the application includes starting, by the single runtime environment, a new process for the application, the new process being separate from a previously created process corresponding with execution of a second application that is coded with only web-technology programming languages.

19. A method for providing cross system installation of applications, comprising:

providing, via a server, an application for installation on a client computing device, wherein the application is coded only with web-technology programming languages, the application being executable on the client computing device without compilation;

providing, via the server, a single runtime environment for installation on the client computing device, wherein the single runtime environment provides the application access to computer system-level services that are not available to web applications running within a browser window; and uninstalling the application from the client computing device by completely removing the application from a sandboxed area of a memory of the client computing device, wherein the single runtime environment controls the installation and uninstallation of the application on the client computing device, and wherein the application, in conjunction with the single runtime environment, executes independently from a web browser and executes as a separate process from a process of the runtime environment.

* * * * *